US012327971B2

(12) United States Patent
Stewart et al.

(10) Patent No.: US 12,327,971 B2
(45) Date of Patent: Jun. 10, 2025

(54) LIGHT BULB AND POWER ADAPTER COMBINATION HAVING AN EDISON SCREW

(71) Applicants: David Stewart, Williamsville, NY (US); Joseph T. J. Stewart, Williamsville, NY (US)

(72) Inventors: David Stewart, Williamsville, NY (US); Joseph T. J. Stewart, Williamsville, NY (US)

( * ) Notice: Subject to any disclaimer, the term of this patent is extended or adjusted under 35 U.S.C. 154(b) by 396 days.

(21) Appl. No.: 18/054,744

(22) Filed: Nov. 11, 2022

(65) Prior Publication Data

US 2023/0155335 A1 May 18, 2023

Related U.S. Application Data

(60) Provisional application No. 63/264,000, filed on Nov. 12, 2021.

(51) Int. Cl.

*H01R 33/94* (2006.01)
*F21S 4/10* (2016.01)
*H01R 33/22* (2006.01)

(52) U.S. Cl.

CPC ................ *H01R 33/94* (2013.01); *F21S 4/10* (2016.01); *H01R 33/22* (2013.01)

(58) Field of Classification Search

None
See application file for complete search history.

(56) References Cited

U.S. PATENT DOCUMENTS 5,833,357 A * 11/1998 Ting ........................ F21L 14/02 439/654
8,007,130 B2 * 8/2011 Wu ........................ H01R 24/30 439/502
8,317,374 B2 * 11/2012 Hedrick .................. F21L 14/02 362/399
9,267,653 B2 * 2/2016 Benner .................. F21S 8/026

* cited by examiner

*Primary Examiner* — Tho D Ta
(74) *Attorney, Agent, or Firm* — Simpson & Simpson, PLLC

(57) ABSTRACT

A light bulb socket adapter comprising a main body having an internal cavity, the main body having a first end and a second end, the first end having an Edison screw extending therefrom, a power supply driver arranged within the main body in communication with the Edison screw, a primary light source arranged within the main body proximate the second end, the primary light source in communication with the Edison screw, a processor arranged within the main body and in communication with the power supply drive, the processor in communication with at least one sensor within the main body, the processor having a radio transceiver and at least one antenna, and an electrical output in communication with the power supply driver. The light bulb socket adapter may also include at least one of a passive heat management system and an active heat management system.

20 Claims, 8 Drawing Sheets

LIGHT BULB AND POWER ADAPTER COMBINATION HAVING AN EDISON SCREW

CROSS-REFERENCE TO RELATED APPLICATIONS

This application claims priority pursuant to 35 U.S.C. 119(a) to U.S. Provisional Patent Application No. 63/264,000, filed Nov. 12, 2021, which application is incorporated herein by reference in its entirety.

FIELD

The present invention relates generally to a light bulb and power adapter combination having an Edison screw that is arranged to engage a standard E-26 socket.

BACKGROUND

A pronged socket is the most ideal electrical output for power tools and is preferred on most jobsites and construction sites. However, most construction sites, especially at the beginning construction stages, do not have electrical outlets installed until later in the build. Moreover, these electrical outlet circuits are temporary and are often shut off or disconnected as construction proceeds. On the other hand, temporary lighting circuits, such as rope lighting or safety lighting, are typically always energized. These lighting circuits use a dedicated "always on" circuit.

A standard Occupation Safety and Health Administration ("OSHA") approved construction site requires that construction areas, ramps, runways, corridors, offices, shops, and storage areas be lighted according to standard number 1926.56(a) Illumination, while providing for a minimum illumination intensities provided at https://www.osha.gov/laws-regs/regulations/standardnumber/1926/1926.56. However, it is also common on a construction site to have a need to provide a source of electricity for power tools and other electrical equipment. This need is presently met by the use of extension cords. A reason for this is that it is a violation of OSHA regulations to tap the illumination lighting circuit with a commonly known Edison socket to outlet adapter. This is because the typical Edison socket adapters exceed the maximum voltage requirements of the temporary string lights that are used to satisfy the requirements of 1926.56(a) Illumination. Another potential problem is that conventional Edison socket adapters are not grounded, which poses another violation of OSHA regulations.

Accordingly, there is a long-felt need for an electrical output adapter for temporary string lights or safety lights, especially on construction sites, that provides an additional source of electricity for power tools and other equipment, in compliance with OSHA regulations.

There is another long-felt need for an electrical output adapter for temporary string lights or safety lights, especially on construction sites, that provides an additional source of electricity for power tools and other equipment, in compliance with OSHA regulations which also includes heat-mitigation components to protect an onboard CPU from heat-related degradation.

There is also a general need for an electrical output adapter for temporary string lights or safety lights that includes an antenna capable of receiving signals from at least one external sensor and communicating that signal to a central hub and/or system.

Lastly, there is a need for an electrical output adapter for temporary string lights or safety lights, having a processor, antenna, and radio contained within a weather-proof body, where the adapter also includes at least one of a passive heat management system and an active heat management system to prevent heat degradation of internal electrical components over an extended period of use.

SUMMARY

The present invention generally comprises light bulb socket adapter (100), comprising input body (104) arranged to removably secure to output body (105) forming internal cavity (106), Edison screw (107) extending from input body (104), power supply driver (108) arranged within cavity (106), power supply driver (108) having VAC pass-through (113), power supply driver (108) in communication with Edison screw (107), light source socket (111) arranged within output body (105), light source socket (111) in communication with VAC pass-through (113), and at least one output socket (112) arranged on input body (104), the at least one output socket (112) in communication with power supply driver (108).

In some configurations, light bulb socket adapter (100) may also include fan housing (150) arranged with output body (105), fan housing (150) having at least one inlet (152*a*-152*d*) and at least one outlet (154), the at least one inlet (152*a*-152*d*) in fluid communication with at least one outlet (154), and fan (151) arranged in fan housing (150), fan (151) in fluid communication with at least one inlet (152*a*-152*d*) and at least one outlet (154).

The present invention may alternatively comprise light bulb socket adapter (200), comprising main body (201) having internal cavity (206), the main body having first end (202) and second end (203), first end (202) having Edison screw (207) extending therefrom, power supply driver (208) arranged within cavity (206) in communication with Edison screw (207), primary light source (210) arranged within main body (201) proximate second end (203), primary light source (210) in communication with Edison screw (207), processor (220) arranged within cavity (206) and in communication with power supply driver (208), processor (220) in communication with at least one sensor (230 and/or 232) within cavity (206), processor (220) having radio transceiver (222) and at least one antenna (221), and electrical output (212) in communication with power supply driver (208).

In some arrangements, light bulb socket adaptor (200) may further comprise fan housing (250) arranged on an external surface of main body (201), fan housing (250) having at least one external inlet port (252) and at least one external outlet port (254), fan (251) arranged in fan housing (250) and in communication with power supply driver (208), at least one external inlet port (252) in fluid communication with fan (251), and passageway (253) within main body (201), passageway (253) in fluid communication with at least one external inlet port (252) and at least one external outlet port (254).

In other configurations, light bulb socket adapter (200) may further include heat sink aperture (261) arranged within main body (201), heat sink aperture (261) having an opening on an external surface of the main body and opening (262) arranged on an internal surface of main body (201), and heat sink apparatus (260) arranged within heat sink aperture (261), heat sink apparatus (260) having plurality of radiator fins (263) extending therefrom.

In further configurations, power supply driver (208) of light bulb socket adapter (200) includes VAC pass-through (213), VAC pass-through (213) in communication with at least primary light source (210), or primary light source (210) and secondary light source (211).

A primary object of the present invention is to provide a device that provides an adapter to an Edison socket and includes at least one output socket, i.e., electrical outlet, and a light source.

A secondary object of the present invention is to provide a device that is connectable to temporary string lights—providing a light socket and a low-voltage connection.

A further object of the present invention is to provide a device that does not exceed the maximum voltage coming from temporary string lights as required by OSHA, namely by converting an AC current (alternating current) to a DC current (direct current) to afford power tool connectivity.

Still another object of the present invention is to provide a device that provides an adapter to an Edison socket having at least one output socket, i.e., electrical outlet, a light source, a secondary and ambient light source, and a sensor, specifically a humidity sensor and/or a temperature sensor.

An even further object of the present invention is to provide a device that provides an adapter to an Edison socket having at least one output socket and has a heat mitigation configuration to protect an internal CPU (central processing unit) and/or processor.

Another object of the present invention is to provide a device that not only provides an output socket and a light source but also includes a processor capable of receiving and transmitting wireless signals from an external sensor to a central system or hub.

These and other objects, features, and advantages of the present invention will become readily apparent upon a review of the following detailed description of the invention, in view of the drawings and appended claims.

BRIEF DESCRIPTION OF THE DRAWINGS

Embodiments of the present invention are described in detail below with reference to the following drawings. These and other features, aspects, and advantages of the present invention will become better understood with respect to the following description, appended claims, and accompanying drawings. The drawings described herein are for illustrative purposes only of selected embodiments and not all possible implementations and are not intended to limit the scope of the appended claims. In the drawings:

DETAILED DESCRIPTION

Figure 1:
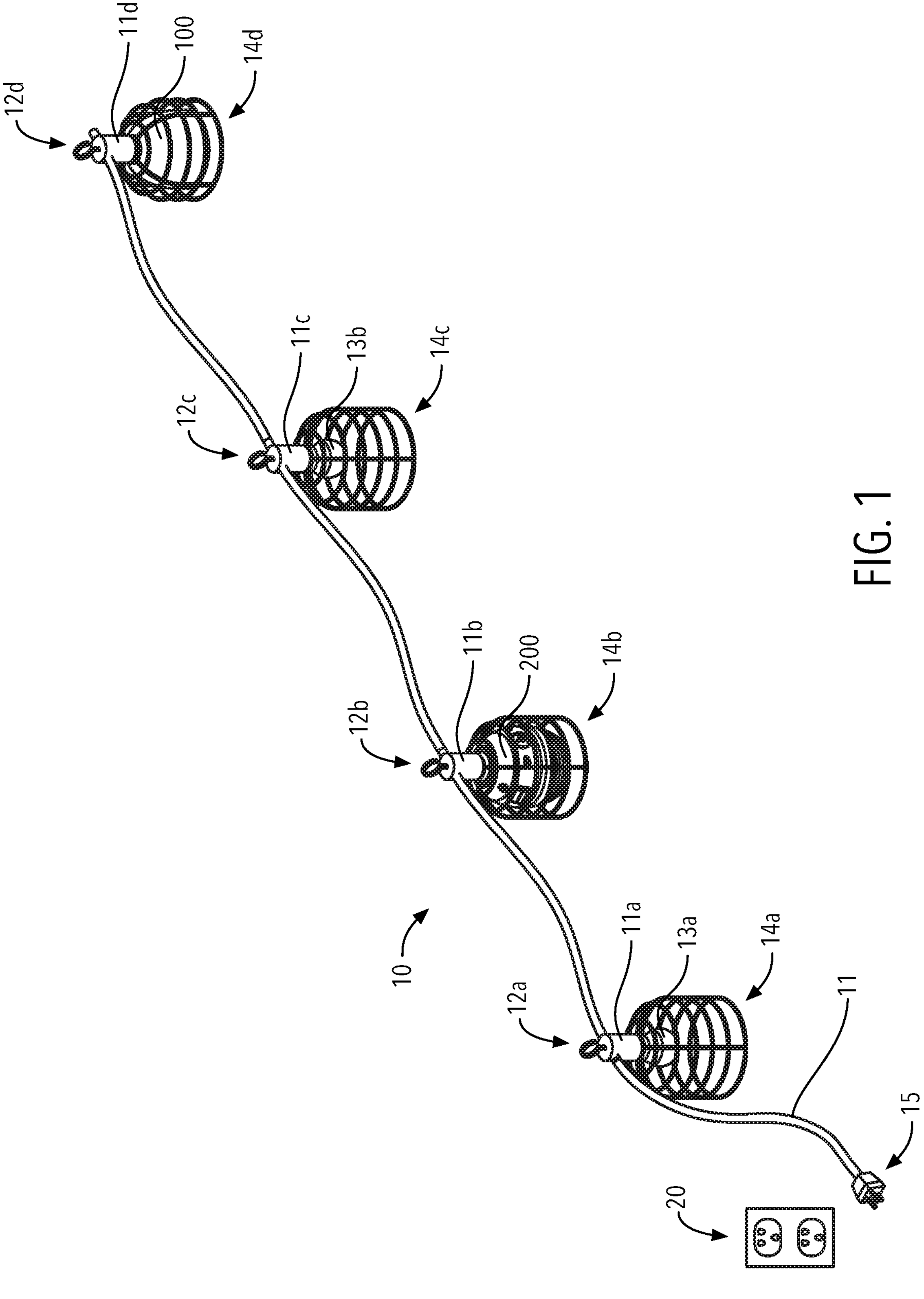
FIG. 1 illustrates a rope light having both embodiments of the present invention engaged thereto.

At the outset, it should be appreciated that like drawing numbers on different drawing views identify identical, or functionally similar, structural elements. It is to be understood that the claims are not limited to the disclosed aspects.

Furthermore, it is understood that this description is not limited to the particular methodology, materials and modifications described and as such may, of course, vary. It is also understood that the terminology used herein is for the purpose of describing particular aspects only and is not intended to limit the scope of the claims.

Unless defined otherwise, all technical and scientific terms used herein have the same meaning as commonly understood to one of ordinary skill in the art to which this invention pertains. It should be understood that any methods, devices or materials similar or equivalent to those described herein can be used in the practice or testing of the example embodiments. The term "VAC" means "volts alternating current", and the term "VDC" means "volts direct current". The term "AC" means "alternating current" and the term "DC" means "direct current".

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims.

It should be further appreciated that the directional terms, e.g., "upward", "downward", "rightward", "leftward", and similar variations thereof, pertain to the corresponding figures described herein as they are illustrated. For example, "component X being positioned rightwardly relative to component Y", means that "component X" is located to the right of "component Y" with respect to the drawing to which it pertains.

Still further, it should be appreciated that the term "communication" refers to an electrical current that passes between the described components herein. The term "communication" implies that the components described to be in "communication" are connected via a conductive medium to allow movement of an electric charge, e.g., wires, or the like.

It should also be noted that the phrase "data communication" refers to a plurality of possible wireless signals, such as, but not limited to: radio waves, Wi-Fi, cellular signal, LAN, WAN, and/or the like.

As also used herein, the term "fluid communication" and/or substantial equivalents thereof, are meant to mean two or more components are connected such that a substance, e.g., gases, fluid, etc., can flow between and/or within the two components. "Fluid communication" and/or equivalents thereof, are also intended to include heat transfer between two or more components.

The follow description refers to "Edison sockets" and "Edison screws". The terms "Edison sockets" and "Edison screws" reference a standard light bulb socket, that is, the female socket that a light bulb is engaged to typical via threading, and a standard light bulb screw, that is, the male member of the standard light bulb that engages a standard light bulb socket typically via a threading. "Edison sockets" and "Edison screws" referenced herein may be E12, E17, E40, GU10, GU24, Medium Bi-Pin, Single Bi-Pin, B22, and bi-post, but are non-limiting such that the present invention may be adaptable to any other suitable socket that would accept a light bulb screw.

The invention described herein is preferably arranged to threadably engage any one of the light sockets of a temporary string light, and, specifically, a temporary string light that is OSHA approved and satisfies the requirements of OSHA standard number 1926.56(a) Illumination. An example of an OSHA-approved temporary light fixture is the PLT GL100-123-MPC String Light set (indicated generally by numeral "10" in FIG. 1), which can be found at: https://www.1000bulbs.com/product/8304/TEMP-GL100123C.html?gclid=Cj0KCQiAsqOMBhDFARIsAFBTN3f_-DbLsVmYa2UJ2yWx5FpznYV60F6p23EHo8ESIwvAo_LBQSgEa8aAgJvEALw_wcB#detail-tabs The terms and/or phrases "main hub" or "main system", generally indicated by reference numeral "300", refer to the invention described in U.S. patent application Ser. No. 17/648,647, titled Portable Monitoring and Sensing Device for Construction Sites and filed on Jan. 21, 2022, which application is hereby incorporated by reference in its entirety.

The present invention described herein has two embodiments that provide an enclosure for electrical components. Both embodiments have an Edison screw arranged at a first end, or the input end, or input body, of the enclosure. Both embodiments have an internal power supply driver arranged to convert an input VAC current to a VDC output current, specifically the internal power supply driver is arranged to convert 100-240 volts VAC to a lower voltage VDC of approximately 12 volts, 24 volts, and/or 48 volts DC, depending on the temporary light fixtures' voltage requirement on a construction site—however it should be noted that the lower voltage VDC may be within the approximate range of 5-70 volts. The power supply driver is in electrical communication with at least one power outlet that is arranged on the outside surface of the enclosure. Both embodiments include a VAC power supply bypass, allowing a light source outlet to provide the input VAC current to an engaged light source. The power supply driver may also be of waterproof construction. The power supply driver may be a Mean Well Power Supply, Part No.: #EPP-120S-48 (having an input voltage of approximately 80-264 VAC, an output voltage of approximately 48 VDC, an output current of approximately 2.5 Amps, and an approximate maximum power of 120 watts), or a similarly-capable and constructed component. The power supply driver may also provide VAC pass-through (i.e., VAC power supply bypass).

Both embodiments of the present invention generally include two bodies that are arranged to be removably connected to form an internal cavity therein. The two bodies are generally referred to as an input body (i.e., the body having an Edison screw) and an output body (i.e., the body having an Edison socket and/or a light fixture socket/connection).

The present invention is generally a light socket adapter. It should be appreciated that, hereinafter, the first embodiment of the light socket adapter of the present invention is referred to as "Puck" and the second embodiment of the present invention is referred to as "Prism", and are designated by reference numerals 100 and 200, respectively.

String Light

Adverting now to the figures, FIG. 1 generally illustrates string light 10 having puck 100 and prism 200, of the present invention, engaged thereto. String light 10 comprises wire 11 having a plurality of Edison sockets, Edison sockets 11*a* through 11*d*, in connection with wire 11. Plug 15 is located at a terminating end of wire 11 and is arranged to engage VAC power source 20—to provide VAC current to string light 10. In some embodiments of string light 10, Edison sockets 11*a* through 11*d* each have hooks 12*a* through 12*d* extending therefrom, respectively. Hooks 12*a* through 12*d* allow Edison sockets 11*a* through 11*d*, and thereby string light 10, to be hung in a desired area. Edison sockets 11*a* and 11*e* have light bulbs 13*a* and 13*b* engaged thereto, respectively. Edison sockets 11*b* and 11*d* have puck 100 and prism 200 engaged thereto, respectively. Each of Edison sockets 11*a* through 11*d* have cages 14*a* through 14*d*. Cages 14*a* through 14*d* are sandwiched between either an Edison socket and a light bulb (i.e., Edison socket 11*a* and light bulb 13*a* and/or Edison socket 11*e* and light bulb 13*c*), an Edison socket and puck 100 (i.e., Edison socket 11*d* and puck 100) and/or an Edison socket and prism 200 (i.e., Edison socket 11*b* and prism 200). It should be appreciated that Edison sockets 11*a* through 11*d* of string light 10 are connected in parallel.

Puck

Figure 2:
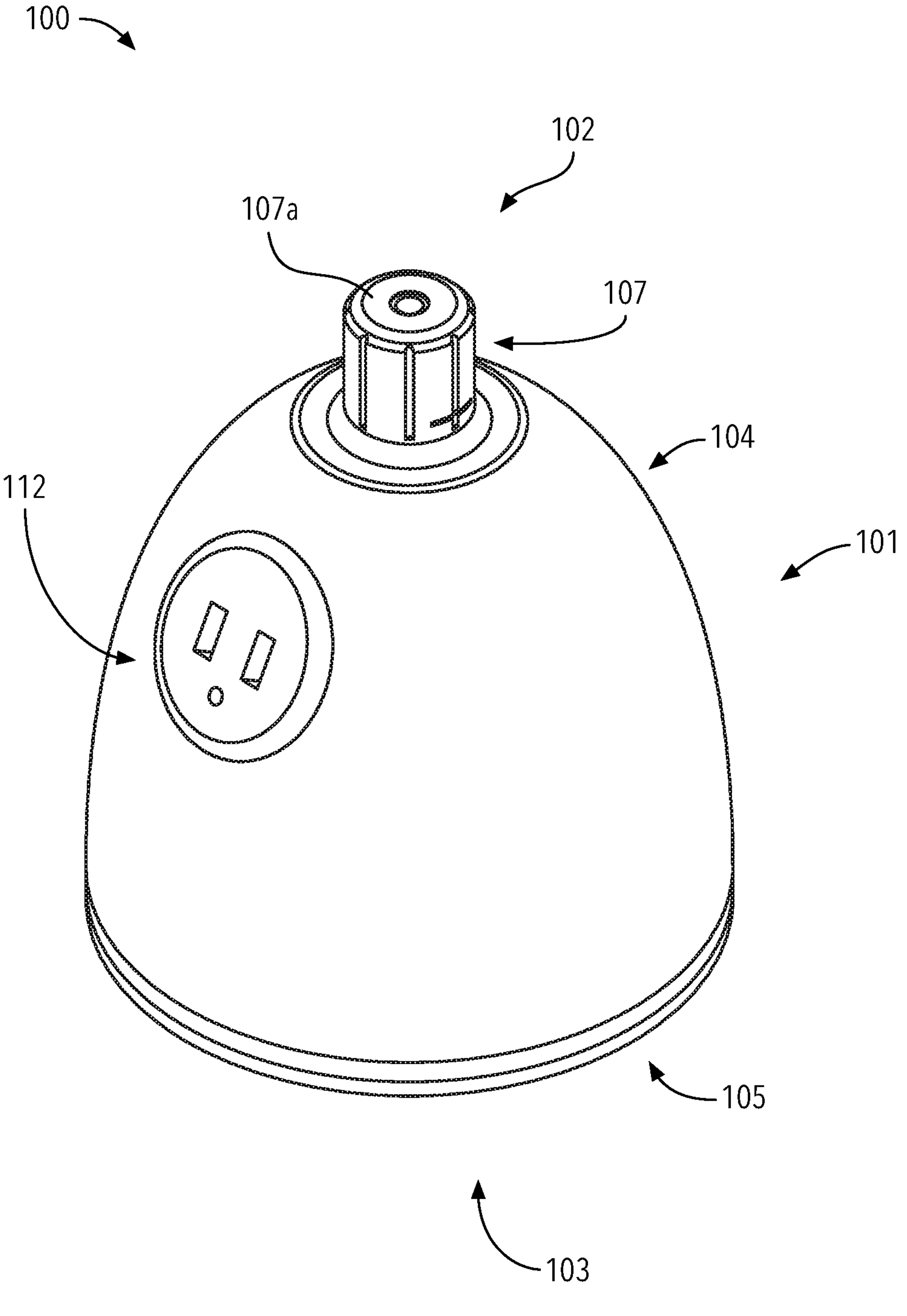
FIG. 2 illustrates a perspective view of the first embodiment of the present invention.
Figure 3:
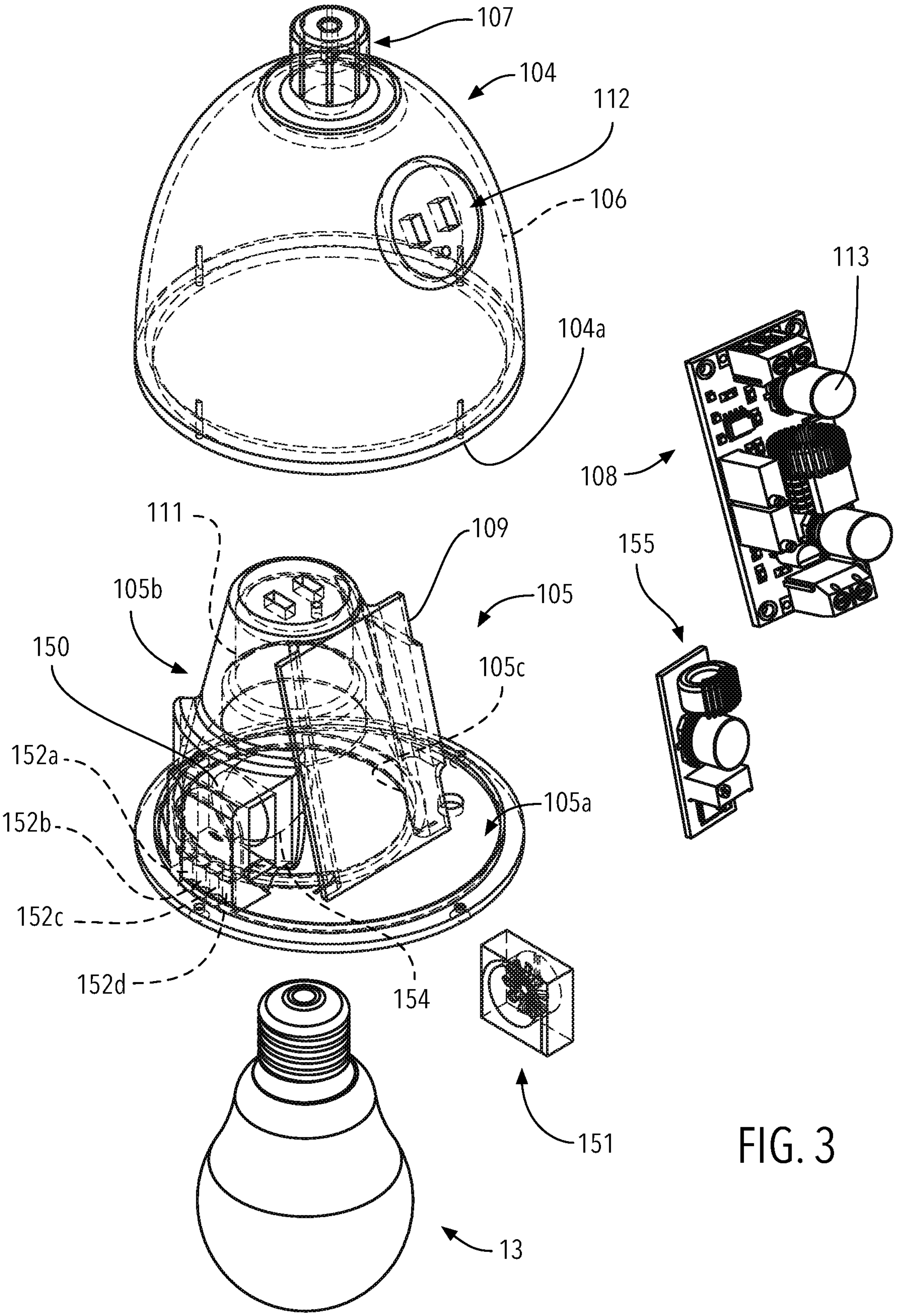
FIG. 3 illustrates an exploded view of the invention shown in FIG. 2.
Figure 4:
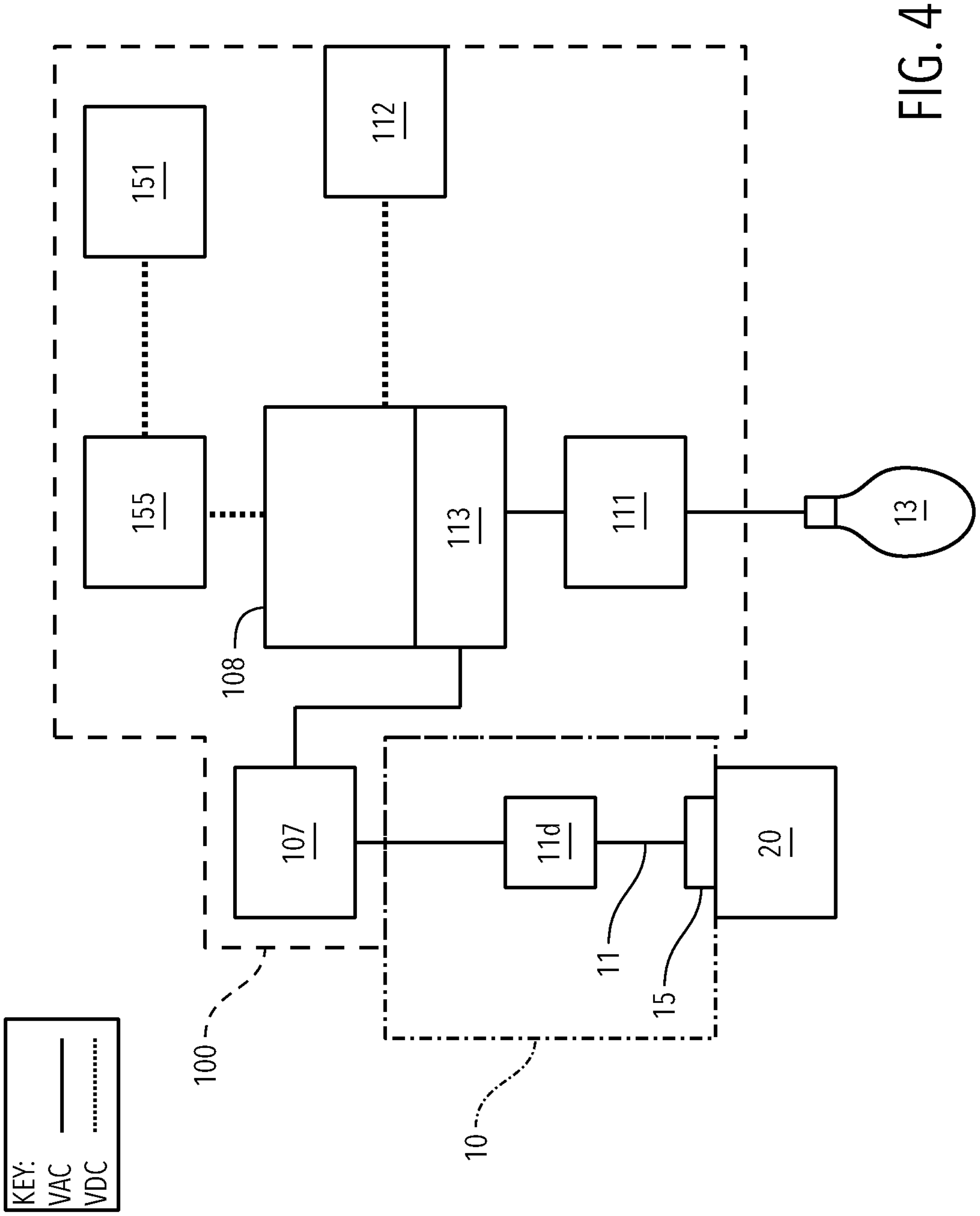
FIG. 4 illustrates a high-level electrical schematic of the invention shown in FIG. 2.
Figure 5:
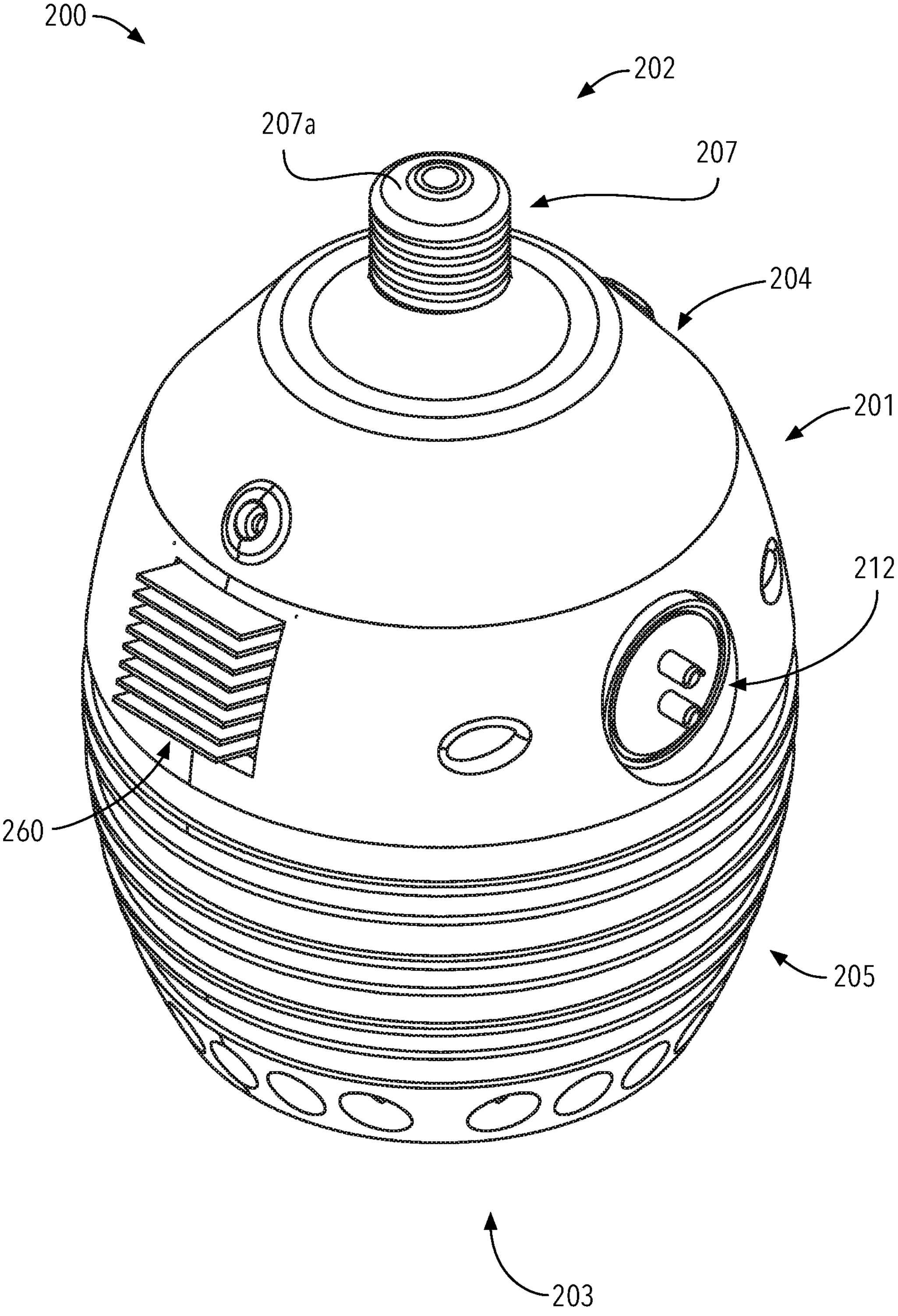
FIG. 5 illustrates a perspective view of the second embodiment of the present invention.

The following description pertains to the first embodiment of the light socket adapter of the present invention, puck 100, and should be taken in view of FIGS. 1 through 4. FIGS. 2 through 4 illustrate a perspective view of puck 100, an exploded skeleton view, and a high-level schematic of the same, respectively.

The light bulb socket adapter, puck 100, of the present invention, generally comprises main body 101 having input body 104 arranged to removably secure to output body 105 thereby forming internal cavity 106. Edison screw 107 extends from input body 104 proximate proximal end 102 of main body 101. Power supply driver 108 arranged within cavity 106, specifically attached to component plate 109, where component plate 109 extends from base 105*a* of output body 105. Power supply driver 108 includes a VAC pass-through (generally designated by 113). Power supply driver 108 is arranged to be in electrical communication with Edison screw 107, i.e., power supply driver 108 receives VAC current. Light source socket 111 is arranged within output body 105, specifically within bulb housing 105*b* of base 105*a*. Light source socket 111 is in communication with VAC pass-through 113 of power supply driver 108, i.e., light source socket 111 is arranged to receive VAC current, i.e., light source socket 111 receives the specific VAC current from VAC source 20 via Edison screw 107 engaged to Edison socket 11*d* of light string 10. At least one output socket, output socket 112, is arranged on input body 104, where output socket 112 is in electrical communication with power supply driver 108, i.e., output socket 112 is arranged to receive VDC current.

Input body 104 includes attachment end 104*a* which is arranged to removably secure to base 105*a* of output body 105 via fasteners, threading, snap-fit, frictional fit, or like means—such that input body 104 can be removed from output body 105 to access the internal components contained within cavity 106 when input body 104 is engaged to output body 105.

Edison screw 107 includes protruding section 107*a*. Protruding section 107*a* extends from proximal end 102 of input body 104. Protruding section 107*a* allows cage 14*d* to be secured thereon and sandwiched between Edison screw 107 and Edison socket 11*d*, when puck 100 is engaged thereto. See FIG. 1.

It should be appreciated that light source socket 111 could be an Edison socket or could be a socket arranged to accept an LED driver and a corresponding LED light apparatus, or other like alternatives. Light source socket 111 is arranged to accept light bulb 13 therein, powering light bulb 13 via VAC current from VAC pass-through 113. Light source socket 111 affords the 120-240 VAC current received from engaged Edison screw 107 to a VAC current source (i.e., string light 10). Light source socket 111 is arranged to accept a light bulb, or other light emitting device, to illuminate a surrounding area as required by OSHA standard number 1926.56(a). Light source socket 111 may be arranged to accept E12, E17, E40, GU10, GU24, Medium Bi-Pin, Single Bi-Pin, B22, or bi-post light bulbs, or any other suitable light bulb connection.

The light bulb socket adapter, puck 100, may also include fan housing 150 arranged on output body 105 (within cavity 106 when input body 104 is engaged to output body 105). Specifically, fan housing 150 extends from base 105*a* of output body 105 and is connected to, or integral with, bulb housing 105*b*. Fan housing 150 has at least one inlet (152*a*-152*d*) and at least one outlet, outlet 154. Inlets 152*a* through 152*d* are open to distal end 103 of main body 101. Outlet 154 is an aperture that is open to fan housing 150 at one terminating end and open to bulb aperture 105*c* of bulb housing 105*b*. At least one of inlets 152*a*-152*d* is in fluid communication with outlet 154 and fan 151. Fan 151 is arranged within fan housing 150 and is positioned substantially between inlets 152*a*-152*d* and outlet 154. In other words, fan 151 is in fluid communication with at least one of inlets 152*a*-152*d* and outlet 154. It should be noted that in some configurations, fan housing 150 and bulb housing 105*b* could have one than one outlet.

Fan 151 is arranged to receive VDC from buck regulator 155. Buck regulator 155 is in electrical communication with power supply driver 108 such that buck regulator 155 receives VDC from power supply driver 108 and steps that incoming VDC down, e.g., 48 VDC stepped down to 12 VDC, etc., to power fan 151.

Fan 151 is arranged to move ambient and/or external air (from outside of main body 101) by pulling the external air into fan housing 150 through inlets 152*a*-152*d* and pushing that air through outlet 154 into bulb aperture 105*c* of bulb housing 105*b*, thereby temperature regulating bulb housing 105*b*. This configuration pushes heat downwardly, i.e., through bulb aperture 105*c* proximate distal end 103 of main body 101—creating air/heat circulation to manage the internal temperature of puck 100.

Output socket 112 is arranged on input body 104, where output socket 112 is in electrical communication with power supply driver 108, i.e., output socket 112 is arranged to receive VDC current. Output socket 112 is preferably arranged to output VDC, within the range of 5 to 48 VDC, that is output socket 112 receives VDC from power supply driver 108, where power supply driver 108 is arranged to rectify VAC current from Edison screw 107 to VDC. Output socket 112 may take various forms to provide a low voltage output, e.g., a low voltage plug, RJ45 network jack, or a data-over-electricity socket, such as well-known power line communication (PLC) sockets.

By arranging output socket 112 to provide a low voltage, puck 100 allows external tools to be connected to temporary light sources, i.e., string light 10, required on construction sites without exceeding the maximum voltage requirements OSHA sets. This allows easier access to power on construction sites where the temporary light sources are already present as required by OSHA standard number 1926.56(a) without exposing the project managers to OSHA violations. It also should be appreciated that puck 112 and power supply driver 108 could be alternatively configured such that output socket 112 could provide 110 VDC for situations where low-voltage requirements, such as OSHA, are not enforced. It should be noted that the aforementioned description also pertains to prism 200, described infra.

FIG. 4 illustrates a simple electronic schematic of puck 100 engaged to light string 10. Plug 15 of light string 10 engages VAC power source 20, where VAC power source 20 could provide 120 to 240 VAC. Edison screw 107 of puck 100 engages Edison socket 11*d* of light string 10, thereby providing puck 100 with the VAC current from VAC power source 20. Edison screw 107 is in electrical communication with power supply driver 108, where power supply driver 108 also includes VAC pass-through 113. Power supply driver 108 outputs VDC while VAC pass-through 113 outputs VAC. VAC pass-through 113 is in electrical communication with light source socket 111, providing VAC current to an engaged light bulb 13. Power supply driver 108 outputs VDC to buck regulator 155, preferably stepping-down the VDC output from power supply driver 108, or alternatively, stepping-up the VDC output from power supply driver 108. Buck regulator 155 is in electrical communication with fan 151, thereby powering fan 151 with VDC—either stepped-down from buck regulator 155 or stepped-up from buck regulator 155. Power supply driver 108 outputs VDC to output socket 112.

Prism

The following description pertains to the second embodiment of the light bulb socket adapter of the present invention, prism 200 and should be taken in view of FIGS. 1 and 5 through 7. FIGS. 5 through 8 illustrate a perspective view of prism 200, an exploded view, a cross-sectional view taken generally along line 7-7 in FIG. 7, and a high-level schematic of the same, respectively.

In some embodiments, prism 200 may comprise a main body 201 having internal cavity 206, where main body 201 includes proximal end 202 and distal end 203. Edison screw 207 extends from proximal end 202 and is arranged to be threadedly connected to a VAC power source. Power supply driver 208 is arranged within cavity 206, whereas power supply drive 208 is in electrical communication with Edison screw 207, i.e., the power supply driver accepts VAC current. Primary light source 210 is arranged within main body 201 proximate second end 203, whereas primary light source 210 in electrical communication with Edison screw 207, i.e., the primary light source accepts VAC current. Processor 220 is arranged within cavity 206 and is in electrical communication with power supply driver 208, i.e., the processer accepts VDC current. Processor 220 is in data communication and/or electrical communication with sensors 230 and/or 232, whereas sensors 230 and 232 are preferably arranged within cavity 206. Processor 220 is arranged to have radio transceiver 222 and antenna 221. Electrical output 212 is positioned within main body 201, specifically within output aperture 212*a*, and is in electrical communication with power supply driver 208, i.e., electrical output accepts VDC current. Electrical output 212 may also be in data communication with processor 220.

Figure 6:
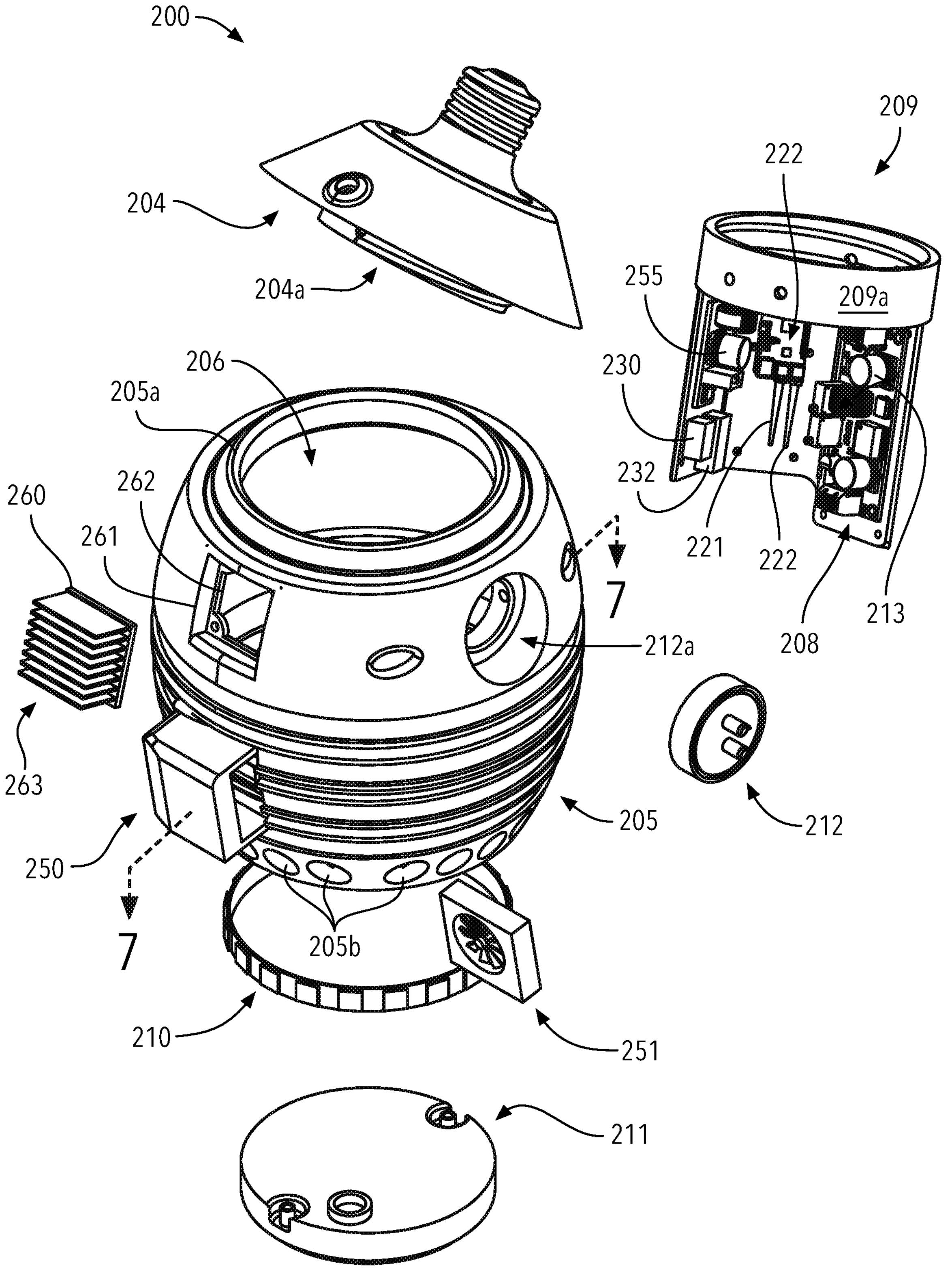
FIG. 6 generally illustrates an exploded view of the invention shown in FIG. 5.
Figure 7:
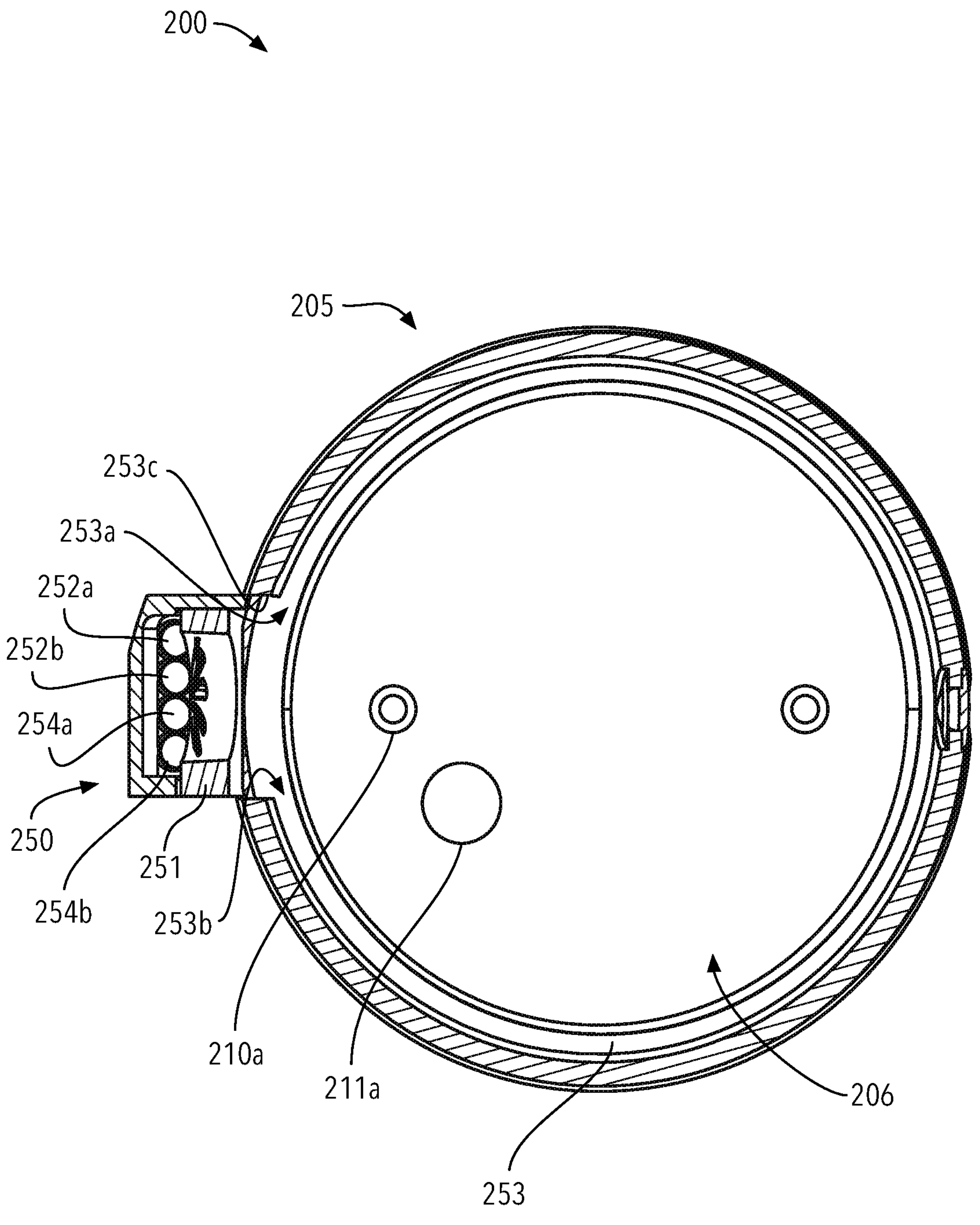
FIG. 7 illustrates a cross-sectional view taken generally along line 7-7 in FIG. 6; and, FIG. 8 illustrates a high-level electrical schematic of the invention shown in FIG. 5.

In some arrangements and as shown in FIGS. 6 and 7A, fan housing 250 extends from or is integral with main body 201. Fan housing 250 includes external inlet port 252 and external outlet port 254. Fan 251 is also arranged in fan housing 250 and is in electrical communication with the power supply driver 208 and/or buck regulator 255, where buck regulator 255 is in electrical communication with power supply driver 208, i.e., the fan accepts VDC current from either the power supply driver or the buck regulator.

External inlet port 252 is in fluid communication with fan 251, where external inlet port 252 and external outlet port 254 define the terminating ends of passageway 253. Passageway 253 is embedded within the wall of main body 201. Passageway 253 in fluid communication with external inlet port 252 and external outlet port 254.

Main body 201 may be configured to have two bodies, input body 204 and output body 205, where the two bodies may be threadedly secured thereto to form main body 201—input body 204 and output body 205 may be secured may a plurality of different means, such as, but not limited to quick-connect means, snap-fit, a plurality of threaded members such as screws, etc., so long as input body 204 and output body 205 may be disengaged to allow access to cavity 206. Main body 201 may also include component holster 209 which could be removably secured to main body 201 within cavity 206, sandwiched between input body 204 and output body 205, removably secured to input body 204, or removably secured to output body 205. Component holster 209 is arranged to provide a substantially suspended platform for various internal components of prism 200 to be secured thereon, thusly providing space between the internal surface of main body 201, i.e., the surface of cavity 206, specifically, space between the internal surface of output body 205. This arrangement allows air to circulate and move within cavity 206 to manage heat exchange of the components of prism 200.

As shown in FIG. 6, input body 204 includes protruding section 204*a* (which may be threaded or have other attachment means as described above). Protruding section 204*a* is arranged to accept collar 209*a* of component holster 209 thereon, thereby securing component holster 209 to input body 204 when protruding section 204*a* is inserted into aperture 205*a* of output body 205.

Edison screw 207 includes protruding section 207*a*. Protruding section 207*a* extends from proximal end 202 of input body 204. Protruding section 207*a* allows cage 14*b* to be secured thereon and sandwiched between Edison screw 207 and Edison socket 11*b*, when prism 200 is engaged thereto. See FIG. 1.

Output body 205 includes plurality of apertures 205*b*, arranged at an end of output body 205 opposite from aperture 205*a*. Plurality of apertures 205*b* provide lighting apertures to direct light emitted from primary light source 210. Plurality of apertures 205*b* are preferably arranged to circumscribe the entirety of the external surface of output body 205—to provide for optimal illumination over a selected area.

In a preferred embodiment, prism 200 includes processor 220. Processor 220 is in communication with power supply driver 208—processor 220 receives VDC current. Processor 220 is a CPU and/or microprocessor that includes, or is in data communication with, at least antenna 221 and radio 222. In a preferred embodiment, antenna 221 is a wireless communication antenna, such as, but not limited to a Wi-Fi antenna. Antenna 221 is arranged to provide processor 222 a communication protocol with a main system or hub, allowing processor 220 to provide a Wi-Fi signal therefrom. Antenna 221 may resemble a Wi-Fi booster, such that, when power is provided to processor 220, antenna 221 may rebroadcast a Wi-Fi signal that originates from a main system or hub. Processor 220 may be a Raspberry Pi 4 CPU (Raspberry SC15184 Pi 4 having a Broadcom BCM2711, quad-core Cortex-A72 (ARM v8) 64-bit SoC @ 1.5 GHz; and, a 2.4 GHz and 5.0 GHz IEEE 802, 11b/g/n/ac wireless LAN, Bluetooth® 5.0, BLE), or a substantially equivalent processor, CPU, and/or microprocessor. It should be appreciated that antenna 221 is not limited to Wi-Fi and could be arranged to provide for a plurality of wireless communication protocols—LAN, WAN, proximity, etc.

Processor 220 is preferably in data communication with humidity sensor 230 and temperature sensor 232, where both humidity sensor 230 and temperature sensor 232 are arranged to respectively measure the humidity and temperature with cavity 206. In some arrangements, humidity sensor 230 and temperature sensor 232 are in data communication with processor 220 and transmit their respective humidity and temperature measurements to processor 220, where processor 220 may be configured to activate an active temperature management apparatus. or configuration. in response to a programmable threshold that is determined by the respective humidity and/or temperature measurements received by processor 220. Processor 220 may also be arranged to communicate received humidity and/or temperature measurements to the main system or hub.

Radio 222 is arranged to receive radio signals from external sensors, e.g., smoke alarms, CO (carbon monoxide) alarms, water alarms, motion sensors, etc. As such, radio 222 is programmed to a specific wavelength to correspond to the wavelength, and/or wavelengths, of at least one external sensor. The radio signals are then relayed to processor 220 which may be further arranged to relay those radio signals to the main system 300 via antenna 221. Radio 222 may be arranged as radio wave transceiver.

In some arrangements, main body 201 of prism 200 may include a plurality of heat management components or structures, i.e., components arranged to manage the temperature within cavity 206. The heat management structures may include a passive system or an active system, or a combination thereof. In an embodiment of prism 200 which includes a passive heat management structure, main body 201 may include two fluidly connected apertures, 261 and 262, arranged therein, where aperture 261 is arranged to accept heat sink 260 and aperture 262 is open to cavity 206. Heat sink 260 provides for passive heat exchange from cavity 206 and the external environment, i.e., ambient temperature exchange. Heat sink 260 preferably includes plurality of radiator fins 263, i.e., surfaces, or plates, that extend from heat sink 260 to increase the rate of heat transfer to or from the environment by increasing convection.

In some configurations of prism 200, prism 200 includes an active heat management system. The active heat management system includes fan housing 250, which may extend from an external surface of main body 201. Fan housing 250 includes at least one external inlet (252*a* and 252*b*) and at least one external outlet (254*a* and 254*b*). Passageway 253 is embedded within main body 201 and is a duct, or vent, that is defined by aperture 253*a* and aperture 253*b*, i.e., passageway 253 is in fluid communication with the external inlets and the external outlets. Passageway 253 is fluidly connected to fan housing 250 via aperture 253*c* and thereby fluidly connected to the external outlets and the external inlets. Fan 251 is arranged within fan housing 250 and is in fluid communication with passageway 253, i.e., fan 251 is arranged to intake air from outside of output body 204, through at least one external inlet (252*a* and 252*b*, or at least one external outlet). It should be appreciated that external inlets 252*a* and 252*b* may be bifurcated from external outlets 254*a* and 254*b*, i.e., aperture 253*a* is in fluid communication with only external inlets 252*a* and 252*b* and aperture 253*b* is in fluid communication with only external outlets 254*a* and 254*b*.

Fan 251 is in electrical communication with power supply driver 208, so that fan 251 is powered by VDC current provided by power supply driver 208. Fan 251 could be arranged such that it is in electrical communication with buck regulator 255, where buck regulator 255 is in electrical communication with power supply driver 208. Buck regulator 255 could be arranged as a step-down voltage regulator, i.e., stepping down 48 VDC from power supply driver 208 to 12 VDC, or other lower VDC outputs, to power fan 251. Fan 251 may be in data communication with processor 220 such that processor 220 could power fan 251 on or off. The active heat management system allows the temperature of main body 201 and therefore cavity 206 to be regulated by forcing ambient air through passageway 253—thereby cooling main body 201.

Electrical output 212 is preferably in electrical communication with power supply driver 208, such that electrical output 212 is a socket that provides VDC from power supply driver 208, i.e., output 212 provides approximately a 12-, 24-, or 48-volt DC current. Electrical output 212 may also include a cap or cover to cover output 212, or aperture 212*a*, when not in use. Electrical output 212 may take various forms to provide a low voltage output, e.g., a low voltage plug, RJ45 network jack, or a data-over-electricity socket, such as well-known power line communication (PLC) sockets. Electrical output 212 may also be in data communication with processor 220 to provide data-over-electricity capabilities.

In some embodiments, prism 200 may have primary light source 210 and secondary light source 211, arranged within output body 205 proximate distal end 203—outside of cavity 206. Primary light source 210 may be an LED light strip that is arranged to be illuminate through plurality of apertures 205*b*. Secondary light source 211 may be an LED light such that it provides a more focused, spotlight, illumination from distal end 203 of prism 200. Primary light source 210 and secondary light source 211 are preferably in electrical communication with VAC pass-through 213 of power supply driver 208, i.e., primary light source 210 and secondary light source 211 receive VAC current from Edison screw 207 engaged with a VAC power source. Primary light source 210 and secondary light source 211 may be engaged to light source sockets 210*a* and 211*a* which are arranged within output body 205 proximate distal end 203. Alternatively, prism 200 may have an LED driver engaged to at least one of light source sockets 210*a* and 211*a*. Light source sockets 210*a* and 211*a* are connectors that allow various illumination devices to connected to either VAC pass-through 213, or alternatively, connected to power supply driver 208. It should be appreciated that light sources 210 and 211 may be standard light bulbs, LED lights, LED light strings, or other like illumination devices. In some embodiments, prism 200 includes an Edison socket extending from distal end 203 of main body 201, where the Edison socket would be in electrical communication with VAC pass-through 213 of power supply driver 208—such that prism 200 could accept a light bulb, similar to puck 100.

VAC pass-through 213 is in electrical communication with Edison screw 207 and power supply driver 208, such that when Edison screw 207 is engaged to a VAC power source, VAC pass-through 213 of power supply driver 208 carries VAC to light source sockets 210*a* and/or 211*a*.

Figure 8:
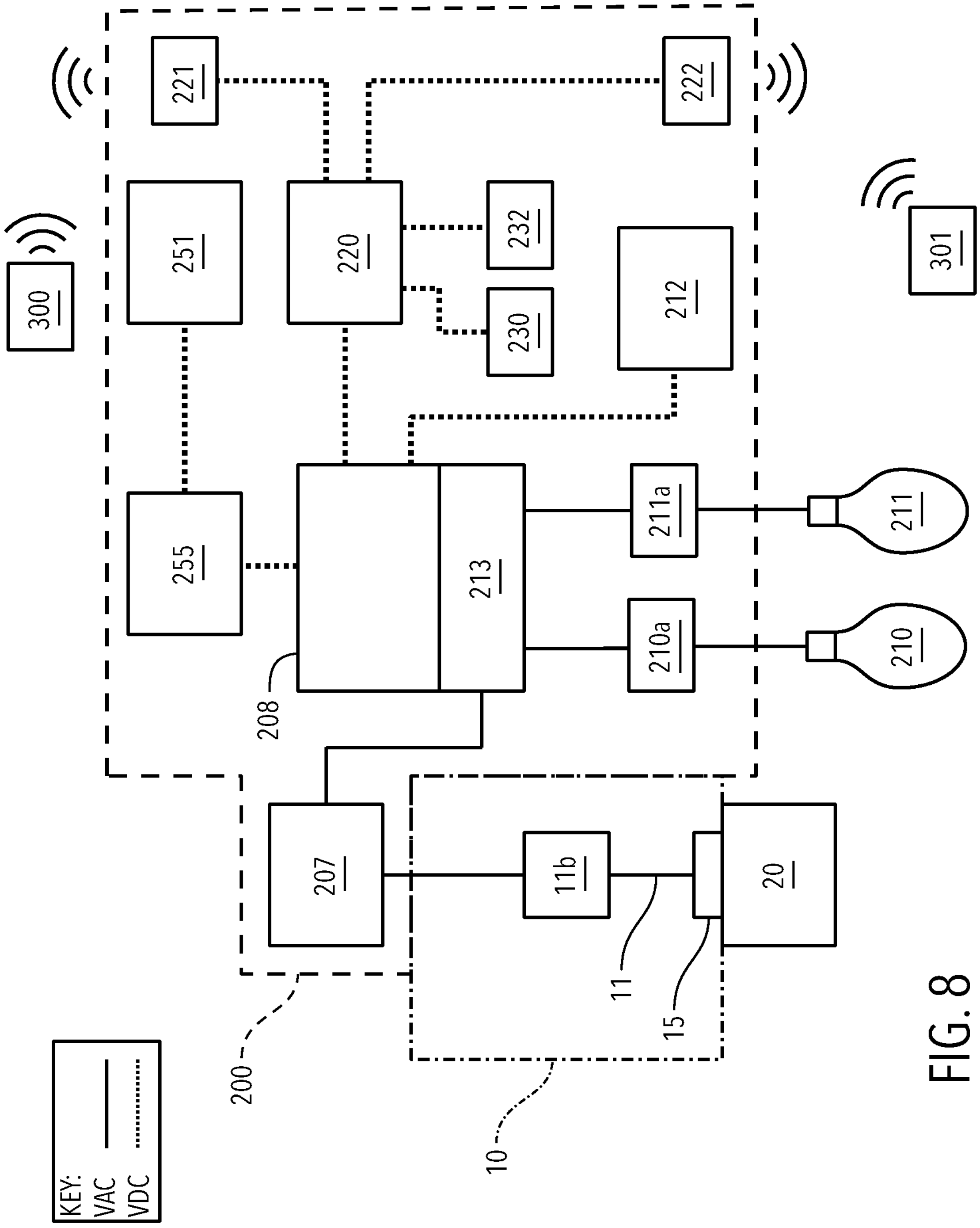

FIG. 8 illustrates an electronic schematic of prism 200 engaged to light string 10. Plug 15 of light string 10 engages VAC power source 20, where VAC power source 20 could provide 120 to 240 VAC. Edison screw 207 of prism 200 engages Edison socket 11*b* of light string 10, thereby providing prism 200 with the VAC current from VAC power source 20. Edison screw 207 is in electrical communication with power supply driver 208, where power supply driver 208 also includes VAC pass-through 213. Power supply driver 208 outputs VDC while VAC pass-through 213 outputs VAC. VAC pass-through 213 is in electrical communication with primary light source 210 via light source socket 210*a* (and/or secondary light source 211 via light source socket 211*a*), providing VAC current. Power supply driver 208 outputs VDC to buck regulator 255, preferably stepping-down the VDC output from power supply driver 208, or alternatively, stepping-up the VDC output from power supply driver 208. Buck regulator 255 is in electrical communication with fan 251, thereby powering fan 251 with VDC—either stepped-down from buck regulator 255 or stepped-up from buck regulator 255. Power supply driver 208 outputs VDC to output socket 212. Power supply driver 208 also outputs VDC to processor 220, wherein processor 220 outputs VDC to antenna 221, radio 222, and sensors 230 and sensor 232.

Antenna 221 may be arranged to wirelessly communicate with main system 300. Radio 222 communicates with external sensor 301 via radio frequency. Radio 222 also communicates with processor 220, which may be programmed to then communicate the signal to antenna 221, where antenna 221 can communicate with main system 300. Antenna 221 may be arranged to also provide a wireless network, e.g., Wi-Fi.

It should be appreciated that prism 200 may also include a Wi-Fi card, a cellular chip set, arranged on processor 220, where antenna 221 could broadcast that wireless network.

Although in a preferred embodiment, puck 100 and prism 200 are substantially weather resistant (i.e., cavities 106 and 206 are sealed), puck 100 and prism 200 may have vent holes to further increase management capabilities.

It should also be appreciated that although puck 100 and prism 200 are illustrated having a singular output socket, 112 and 212, respectively, multiple power outlets may be included.

OSHA Regulations Satisfied by the Present Invention

The present invention, described in this disclosure specifically achieves the regulations outlined by OSHA Standard Number 1915.82—Lighting, [76 FR 24701, May 2, 2011]. It should be appreciated that puck 100 and prism 200 are configured in such a way structurally, and functionally via their structural arrangements, that the aforementioned OSHA Standard is satisfied, i.e., the various embodiments of the present invention are OSHA-compliant.

Further Considerations

The following description should be taken in view of the aforementioned description of the present invention, puck 100 and prism 200, along with string light 10. The Edison sockets, and/or Edison screws, are not intended to be limiting in the appending claims. That is, the connection between the present invention (puck 100 and prism 200) and a power source, i.e., string light 10, may be achieved via bi-pin light connectors (and respective sockets), halogen-type connectors (and respective sockets), fluorescent-type connectors (and respective sockets), and/or other types of light connectors, such as LED connectors. As such, it should be noted that a socket and a connector, a light connector and a light connector socket, are arranged to engage to connect a respective power source, are contemplated and within the scope of the present invention as claimed and like modifications of the embodiments described and illustrated in the present disclosure.

Thus, it is seen that the objects of the invention are efficiently obtained, although modifications and changes to the invention may be readily imagined by those having ordinary skill in the art, and these changes and modifications are intended to be within the scope of the claims.

REFERENCE NUMERALS

10 String light
11 Wire
11*a*-11*d* Edison socket
12*a*-12*d* Hook
13 Light bulb
13*a*-13*b* Light bulb
14*a*-14*d* Light cage
15 Plug
20 VAC power source
100 Puck
101 Main body
102 Proximal end
103 Distal end
104 Input body
104*a* Attachment end
105 Output body
105*a* Base
105*b* Bulb housing
105*c* Bulb aperture
106 Cavity
107 Edison screw
107*a* Protruding section
108 Power supply driver
109 Component plate
111 Edison socket
112 Output socket
113 VAC pass-through
150 Fan housing
151 Fan
152*a* Inlet
152*b* Inlet
152*c* Inlet
152*d* Inlet
154 Outlet
155 Buck regulator
200 Light bulb socket adapter
201 Main body
202 Proximal end
203 Distal end
204 Input body
204*a* Protruding section
205 Output body
205*a* Aperture
206 Cavity
207 Edison screw
207*a* Protruding section
208 Power supply driver
209 Component holster
209*a* Collar
210 Primary light source
210*a* Primary light source socket
211 Secondary light source
211*a* Secondary light source socket
212 Output socket
212*a* Aperture
213 VAC pass-through
220 Processor
221 Antenna
222 Radio transceiver
230 Sensor
232 Sensor
250 Fan housing
251 Fan
252*a* External inlet
252*b* External inlet
253 Passageway
253*a* Aperture
253*b* Aperture
253*c* Aperture
254*a* External outlet
254*b* External outlet
255 Buck regulator
260 Heat sink
263 Radiator fins
261 Aperture
262 Internal aperture
300 Main system
301 External sensor

What is claimed is:

1. A light bulb socket adapter, comprising:
an input body arranged to removably secure to an output body thereby forming an internal cavity;
a light connector extending from said input body,
a power supply driver arranged within said cavity, said power supply driver having a VAC pass-through, said power supply driver in communication with said light connector;
a light source socket arranged within said output body, said light source socket in communication with said VAC pass-through; and,
at least one output socket arranged on said input body, said at least one output socket in communication with said power supply driver.

2. The light bulb socket adapter recited in claim 1, wherein said light connector engages an AC current source, wherein said light connector comprises an Edison screw.

3. The light bulb socket adapter recited in claim 2, wherein said VAC pass-through of said power supply driver directs an AC current from said AC current source to said light source socket.

4. The light bulb socket adapter recited in claim 1, wherein said input body further comprises a hollow protrusion arranged on a top surface of said input body, said hollow protrusion is integral with said input body and said light connector.

5. The light bulb socket adapter recited in claim 4, wherein said hollow protrusion is further arranged to accept a clamp section of a cage thereon, said cage arranged to at least partially surround said light bulb socket adapter and a light bulb engaged to said light connector.

6. The light bulb socket adapter recited in claim 2, wherein said power supply driver is arranged to rectify said AC current to a DC current.

7. The light bulb socket adapter recited in claim 6, wherein said power supply driver is arranged to provide a 48 VDC current.

8. The light bulb socket adapter recited in claim 1 further comprising:
a fan housing arranged on said output body, said fan housing having at least one inlet and at least one outlet, said at least one inlet in fluid communication with said at least one outlet; and, a fan arranged in said fan housing, said fan in fluid communication with said at least one inlet and at least one outlet.

9. The light bulb socket adapter recited in claim 8 further comprising:

a light source housing arranged within said output body, said light source housing have said light source socket arranged therein, wherein said light source socket is arranged to accept a light source therein.

10. A string light having an input end and an output send, said input end arranged to engage a VAC power source, said string light having at least one light connector socket in communication with said VAC power source, said string light having at least one of the light bulb socket adapter recited in claim 1 engaged to and in communication with said at least one light connector socket of said string light.

11. A light bulb socket adapter, comprising:

a main body having an internal cavity, said main body having a first end and a second end, said first end having a light connector extending therefrom;

a power supply driver arranged within said main body in communication with said light connector;

a primary light source arranged within said main body proximate said second end, said primary light source in communication with said light connector;

a processor arranged within said main body and in communication with said power supply driver, said processor in communication with at least one sensor within said main body, said processor having a radio transceiver and at least one antenna; and, an electrical output in communication with said power supply driver.

12. The light bulb socket adapter recited in claim 11 further comprising:

a fan housing arranged on an external surface of said main body, said fan housing having at least one external inlet port and at least one external outlet port;

a fan arranged in said fan housing and in communication with said power supply driver, said at least one external inlet port in fluid communication with said fan; and, a passageway within said main body, said passageway in fluid communication with said at least one external inlet port and said at least one external outlet port.

13. The light bulb socket adapter recited in claim 11, wherein said power supply driver includes a VAC pass-through, said VAC pass-through in communication with said primary light source.

14. The light bulb socket adapter recited in claim 13, where said light connector is arranged to engage a VAC power source, wherein said light connector is an Edison screw.

15. The light bulb socket adapter recited in claim 14, wherein said light connector is arranged to receive a VAC current, said VAC current directed to said primary light source via said VAC pass-through of said power supply driver, wherein said power supply driver outputs VDC.

16. The light bulb socket adapter recited in claim 11, wherein said input body further comprises a hollow protrusion arranged on a top surface of said input body, said hollow protrusion is integral with said input body and said light connector.

17. The light bulb socket adapter recited in claim 16, wherein said hollow protrusion is further arranged to accept a clamp section of a cage thereon, said cage arranged to at least partially surround said light bulb socket adapter.

18. The light bulb socket adapter recited in claim 11, wherein said power supply driver is arranged to convert a 120 VAC current to a 48 VDC current.

19. A string light having an input end and an output send, said input end arranged to engage a VAC power source, said string light having at least one light connector socket in communication with said VAC power source, said string light having at least one of the light bulb socket adapter recited in claim 11 engaged to and in communication with said at least one light connector socket of said string light.

20. The light bulb socket adapter recited in claim 11 further comprising:

a heat sink aperture arranged within said main body, said aperture having an opening on an external surface of said main body and an opening arranged on an internal surface of said main body; and, a heat sink apparatus arranged within said heat sink aperture, said heat sink apparatus having a plurality of radiator fins extending therefrom, wherein said heat sink apparatus is in fluid connection with said internal cavity.

* * * * *